United States Patent Office 3,454,663
Patented July 8, 1969

3,454,663
OXYCHLORINATION USING A DEACON CATALYST SUPPORTED ON ALUMINA α-MONOHYDRATE
André Ryckaert, Uccle-Brussels, and Jacques Gilain, Ixelles-Brussels, Belgium, assignors to Solvay & Cie., Brussels, Belgium
No Drawing. Filed Oct. 25, 1965, Ser. No. 505,188
Claims priority, application France, Oct. 30, 1964, 993,445
Int. Cl. C07c 17/02; B01j 11/46
U.S. Cl. 260—659   5 Claims

ABSTRACT OF THE DISCLOSURE

An improvement in a process for the oxychlorination of unsaturated hydrocarbons, wherein the hydrocarbon is subjected to the action of hydrogen chloride and oxygen in the presence of a Deacon-type catalyst, wherein the Deacon-type catalyst is supported on a microporous alpha-alumina monohydrate.

---

The present invention is directed to a process for the production of chlorinated hydrocarbons, and more particularly, to a so-called oxychlorination process which comprises the steps of contacting an unsaturated hydrocarbon and a mixture of hydrogen chloride and oxygen in the presence of a Deacon-type catalyst. (The use of chlorides obtained "in situ" by the catalytic oxidation of hydrogen chloride according to the Deacon reaction: $2HCl + 1/2 O_2 \rightarrow Cl_2 + H_2O$ is conventionally known as oxychlorination.)

More specifically, the present invention concerns the use of a new catalytic mass which has unexpectedly been found to be extremely active at temperatures below 280° C. Such a catalytic mass has also been found to permit, in particular, the exclusive obtaining of addition products when the oxychlorination of olefins is effected.

It is well known that the oxychlorination of hydrocarbons is effected, generally, in the gaseous phase at an elevated temperature, the elevation of the temperature depending on whether or not the hydrocarbon to be chlorinated is saturated.

Thus, the production of the chlorinated derivatives of saturated hydrocarbons can only be effected at high yield rates by these known processes if the oxychlorination reaction is carried out at a temperature of at least 400° C. At such temperatures, the metallic halides, etc., which constitute the active elements of the catalyst have a strong tendency to become volatile and, therefore, they must be combined with an additive of another metallic halide, acting as a dissolvent, in order to reduce the loss of active elements as well as to increase the active life of the catalyst.

When it is desired to effect the oxychlorination of unsaturated hydrocarbons, in particular olefins, it is well known to operate at somewhat lower temperatures, generally about 300° C. However, it has been found that when operating at temperatures previously employed, there is always a substantial lowering of the activity of the catalyst due to the volatilization of the metallic halides and, moreover, it is difficult to avoid the secondary formation of substitution products.

Therefore, in order to reduce these undesirable influences on the yield rate of chlorinated addition products, various different types of catalysts have been proposed. In general, these catalysts constitute metallic chlorides, etc. disposed on a porous support such as diatomaceous earth, silica (silicious earth) or an activated alumina, the latter having possibly undergone a preheating at a temperature of at least 405° C.

The supports of the previously known processes have been those which most often possess a macroporous structure. Thus, it has already been recognized that when utilizing diatomaceous earth it should have an average pore diameter of at least 3600 Å. Furthermore, use has been made of the activated forms of alumina which are conventionally obtained by dehydrating by heating or calcination various alumina hydrates (hydroxides). It is well known that such treatments have the effect of greatly increasing the diameter of the pores, thereby producing a macroporous structure.

Although the use of catalysts supported by such alumina produces high yield rates during the oxychlorination of olefins at a temperature in excess of 300° C., none of the catalysts which have been used until now has been found to be sufficiently selective to avoid the undesirable parasitic reactions, such as the substitution reactions, associated with the employment of the higher reaction temperatures. Moreover, in the prior art processes, no one has yet been able to oxidize in a sufficient manner the hydrogen chloride which was initially introduced.

In accordance with the present invention, it was unexpectedly found that it is possible to effect the oxychlorination of unsaturated hydrocarbons at a temperature below 280° C. and obtain high yield rates without encountering the previously discussed disadvantages of the prior art processes. In addition, by virtue of the present invention, the support for the catalyst does not have to undergo a pre-treatment.

It is therefore a primary object of this invention to provide a process for the oxychlorination of unsaturated hydrocarbons which can be performed at lower reaction temperatures while maintaining an exceptionally high yield and avoiding unwanted side reactions.

It is a further object of this invention to provide such a process wherein pre-treatment of the catalyst system can be eliminated.

It is yet a further object of this invention to provide such a oxychlorination process wherein a Deacon-type catalyst is supported on an alumina α-monohydrate having a microporous structure.

Still further objects and advantages of the present invention will become apparent from the following more detailed description of the invention.

The present invention consists in submitting an unsaturated hydrocarbon to the action of a gaseous mass composed of hydrogen chloride and oxygen, diluted or not by nitrogen, at a temperature no greater than 280° C., in the presence of a Deacon-type catalyst whose support consists of an alumina α-monohydrate, known as boehmite, having the formula $\alpha\text{-}Al_2O_3\text{-}H_2O$ and possessing a microporous structure.

The unsaturated hydrocarbons that can be oxychlorinated in accordance with the process of this invention include ethylene, propylene, butene-1, butene-2, 3-methyl-butene-1, 1-methyl-butene-2, hexene-1, hexene-2, etc. Of these unsaturated hydrocarbons, ethylene is preferred.

By Deacon-type catalyst is meant a chloride, oxychloride, or oxide of a metal having multiple valences, e.g., copper, iron, titanium, vanadium, chromium, manganese, cobalt, nickel, zirconium, molybdenum, palladium, cadmium, tungsten, platinum, mercury and the rare earth metals, etc. Of these materials, the compounds of copper, iron and the rare earth metals are preferred, with cupric chloride being a particularly preferred catalyst material.

The alumina α-monohydrate of this invention has a specific gravity of about 3.0 and crystallizes in an orthorhombic structure.

It can be obtained by dehydrating, at a moderate temperature, i.e., not substantially exceeding 300° C., and possibly under pressure, other hydrates such as the α- and β-trihydrates of the gels obtained by starting from alkaline aluminates. However, the preparation technique most currently used consists in precipitating an alumina gel by the action of an alkali or of ammonia on an aluminum salt which then need only be dried in order to obtain a solid compound having a finely porous structure, the pores of which have a substantially uniform diameter.

By utilizing this microporous substance with one or several metallic chlorides, etc., applicants have obtained a catalyst which is particularly active at low temperatures.

Such a support can advantageously be impregnated, according to present techniques, with one or more of the Deacon-type catalysts to which it is possible to add a compound of an alkaline earth metal, such as magnesium. Although the possibility of working at temperatures as low as 210° to 250° C. does not require the incorporation of an alkaline compound, one may add such a compound to the active elements of the catalyst system as a promotor. However, in accordance with the present invention, it has been found that the portion of the alkaline or alkaline earth compound present in the catalyst is in no way critical.

The catalytic mass thus produced may be utilized in a fixed bed or a fluidized bed system. Thus, when a fixed bed system is employed, the catalytic particles can be additionally diluted by variable quantities of inert particles, e.g., particles of non-impregnated alumina. The proportion of impregnated particles present in the mass, however, should be from about 5 to about 80% of the total volume.

According to this invention, a boehmite, alumina α-monohydrate is employed whose average pore diameter does not exceed 100 A. Extremely excellent results have been obtained when the diameter of the pores has been between 20 and 60 A. and materials having an average pore diameter within such range are therefore preferred.

A further advantage of this invention resides in the fact that it is not necessary to preheat the support before it is impregnated by the active catalytic elements. In fact, to the contrary, applicants have unexpectedly found that for reaction temperatures of between 210° and 260° C., the yield rate of the addition chlorinated product, taken with respect to the hydrogen chloride utilized, is considerably lowered when an alumina-supported catalyst, which had been previously heated to 750° C., has been used. This yield rate can diminish by more than 50% with respect to the yield rate obtained under the same reaction conditions with a non-preheated catalyst. Such an advantage of the present invention is truly unexpected.

A still further advantage of the catalyst of the present invention is that it permits the avoidance of substitution reactions and the obtaining of substantially pure addition products by allowing reaction to proceed at substantially pressure, it is also possible to maintain the reactor under a pressure which is above atmospheric.

The following specific examples of the process of this invention further illustrate the unobvious and unexpected results achieved by the use of the support of the present invention. These examples are descriptive of various embodiments of the present invention but are in no way to be deemed as limitative thereof.

(A) Examples with the catalyst on a fixed bed

A series of nine tests were carried out with different catalysts disposed on a fixed bed. Each catalyst had as a support an alumina of different porosity varying according to the treatment previously undergone. For each of these catalysts, the following method of preparation was adopted:

After having determined the adsorption capacity of the support by measuring the volume of water adsorbed in a vacuum, the quantities of cupric chloride to be dissolved in order to obtain, after impregnation and drying, the desired percentage of metal disposed on the support (taken as a percentage by weight with respect to the total weight of alumina impregnated) was determined. After impregnation, the support was dried at 120° C. for 16 hours. Each catalyst tested thus contained 7% copper.

In a tubular steel reactor having a diameter of 21 mm. and a height of 370 mm., surrounded by a double envelope for the circulation of oil, there were disposed 40 cubic centimeters of a mixture comprising 1 volume of impregnated particles for 9 volumes of pure support.

Uniformly, for each of the nine tests tabulated in the Table I below, the following flow rates of reagents were also maintained:

|  | Mol per hour |
|---|---|
| HCl | 0.706 |
| Air | 0.970 |
| $C_2H_4$ | 0.420 | which corresponds substantially to the following molar ratios:

$$O_2/HCl = 1.1/4 \text{ and } C_2H_4/HCl = 1.2/2$$

The gaseous products leaving the reactor were then lead to a scrubber for removing the residual hydrogen chloride. After dosing the products obtained, the rate of transformation of the hydrogen chloride introduced was determined.

The table below takes into account the results furnished by a series of nine tests carried out successively under the conditions which have just been described. Each time, the porosity of the alumina support was varied, as shown opposite the notation of its crystallographic structure. The transformation rates have been measured at 3 temperatures: 190, 220 and 250° C.

TABLE I

| Test run | Crystallographic structure of support | Average pore diameter in A. | Gas inlet temperature, ° C. | | |
|---|---|---|---|---|---|
| | | | 190 | 220 | 250 |
| | | | Rate of transformation of HCl, percent | | |
| 1 | Boehmite $\alpha$-$Al_2O_3$.$H_2O$ | 33 | 17.2 | 51.6 | 64.3 |
| 2 | Support 1 oxidized at 750° C: $Al_2O_3\gamma$ or $\eta$ | 92 | | 3.3 | 23.8 |
| 3 | $\alpha$-$Al_2O_3$.$H_2O$ | 30 | 23.0 | 52.0 | 66.0 |
| 4 | $\alpha$-$Al_2O_3$.$H_2O$ | 32 | 7.0 | 54.0 | 70.0 |
| 5 | $\alpha$-$Al_2O_3$.$H_2O$ | 41 | 5 | 46.0 | 70.0 |
| 6 | $Al_2O_3\gamma$ or $\eta$ | 95 | 13.3 | 33.2 | 43.2 |
| 7 | $Al_2O_3\gamma$ or $\eta$ | 96 | 2.0 | 15.0 | 36 |
| 8 | $Al_2O_3\chi$ | 137 | | 2 | 10 |
| 9 | $\alpha$-$Al_2O_3$Corindon | | 0 | 0 | 8 | lower temperatures than possible in prior art processes.

Furthermore, in operating according to this invention, one can maintain high conversion rates for the hydrogen chloride without having to maintain the reaction temperature above 280° C.

Also, although the reaction proceeds with high yield rates when the reaction zone is maintained at atmospheric It is thus surprisingly apparent that at 220° to 250° C., in particular, the transformation rate of HCl is clearly dependent on the structure of the porous support. Thus, it can be 70% at 250° C., when the support has a pore diameter of around 30 A., but becomes equal to 10% when the support is constituted by $\alpha$-$Al_2O_3$ (alumina α-monohydrate) if for such an alumina the pore diameter is only 137 A. The great superiority of the alumina α-monohydrate of the present invention over conventional catalyst supports is certainly unobvious and unexpected.

The undesirable influence of preheating is also clearly shown. A comparison of tests runs 1 and 2 shows clearly the low activity of alumina-supported catalysts when preheated to 750° C. At a reaction temperature of 250° C., the yield rate is divided by three, and at 220° C., by 15.

At 220° C., in particular, all the boehmites according to the invention give the catalyst an activity which is clearly superior to those which, at 250° C., the different activated γ and η aluminas previously known can produce.

boehmites, the following Table III gives the conversion rates of hydrogen chloride which can be obtained, for example, with a catalyst containing 6% copper and 2% potassium, disposed on a boehmite having a pore diameter of 80 A. The tests 13 to 16 took place in the reactor described above, the catalytic bed occupying in every case a volume of 40 cc. In these tests, the impregnated catalytic particles were diluted by graphite, and the molecular ratio of the reagents, as well as their contact times on the catalytic bed were varied. In order to permit a comparison, we have also indicated on the following table the conditions and characteristics for Test No. 4, carried out at 250 degrees with a catalyst having 7% copper.

TABLE III

| Test run | Temperature in °C. | Conditions of dilution | Reagent flow rates in mol, g./hr. | | | Conversion rates of HCl in percent |
|---|---|---|---|---|---|---|
| | | | HCl | Air | $C_2H_4$ | |
| 13 | 250 | 15% impregnated particles plus 85% graphite particles. | 0.606 | 0.756 | 0.325 | 64.5 |
| 14 | 246 | 20% impregnated particles plus 80% graphite particles. | 0.696 | 0.937 | 0.356 | 51.9 |
| 15 | 240 | {25% impregnated particles plus | 0.805 | 1.168 | 0.473 | 80.3 |
| 16 | | 75% graphite particles | 0.711 | 1.955 | 0.447 | 85.5 |
| 4 | 250 | 10% impregnated particles plus 90% non-impregnated support particles. | 0.706 | 0.970 | 0.420 | 70 |

The following tests indicated that the unexpected superiority of the alumina α-monohydrate of the present invention over a conventional alumina support is similarly present where the activated support is diluted with non-impregnated particles. In each case, the impregnated alumina support comprises equal quantities of impregnated and non-impregnated particles with the results of the rate of transformation of HCl being measured at various temperatures. The results are shown in the following Table II.

TABLE II

| Test runs | Crystallographic structure of support | Pore Diameter, A. | Gas inlet temperature, ° C. | | |
|---|---|---|---|---|---|
| | | | 175 | 200 | 225 |
| | | | Rate of transformation of of HCl, percent | | |
| 1 | α-$Al_2O_3 \cdot H_2O$ | 33 | 55 | 80 | 69 |
| 6 | $Al_2O_3$ γ or η | 95 | 26 | 43 | 40 |

The catalysts supported by boehmite, alumina α-monohydrate are again seen to exhibit unusually superior activity. Thus, note where the rate of transformation at 175° C., for the support of the present invention is far greater than that of conventional supports even when employed at much greater temperatures.

The same dilution conditions as in the preceding tests were utilized, but the impregnate was varied. A boehmite support having a pore diameter of 33 A. was impregnated in one test with 70 g. of copper, as cupric chloride, and 20 g. of magnesium, as magnesium chloride, per kg., and in another test only with 70 g. of copper.

It was noted that for these two catalytic masses that at 250° C., the transformation rate was 73% when the copper was supplemented with magnesium, against 65.3% when the copper was used alone.

The two preceding tables indicate the particular advantages possessed by the boehmites according to the present invention with respect to other forms of alumina, one advantage being a substantially improved conversion rate of hydrogen chloride.

Moreover, the conversion rate of hydrogen chloride produced by a catalyst supported by the boehmites of the present invention may obtain values superior to those which have already been cited when certain reaction conditions are modified. Such reaction conditions include, for example, the nature of the active elements disposed on the boehmite, the nature of the inert dilutant, the dilution concentration, the molar ratios among the reagents and their contact times with the catalytic mass.

In order to better illustrate all of the possibilities of the

A comparison of tests 13 to 16 indicates that it is possible to increase the hydrogen chloride conversion rate by modifying the reagent flow rates, their molar ratios, and the dilution of the catalyst. The comparison of the tests, reported above shows that it is not worthwhile to use a boehmite whose pore diameter is too large.

(B) Examples with the catalyst on a fluid bed

Four tests were performed with four different catalysts disposed on a fluid bed. In each case, the concentration of the active element was maintained at 7% copper (or 70 g. copper, as cupric chloride, per kg. of impregnated support).

The reactor was a vertical tube having a diameter of 5.2 cm. and a height of 150 cm., this reactor being electrically heated. The base was furnished with a grill supporting 0.5 liter of catalyst, uniquely constituted by impregnated fine particles.

The particles were then brought to a fluidized state by means of a current of nitrogen. Then, when the temperature of the bed attained the desired level, the introduction of nitrogen was halted in order to lead the reagents into the fluid bed through the grill. The respective flow rates of each reagent are noted in the Table IV below. The gaseous effluent from the reactor passed into a refrigerated trap at −70° C., where the chlorinated products obtained were condensed, while the hydrogen chloride was then adsorbed by the passage of the residual gas in a washing tower fed with water. The analysis of the products thus obtained permitted the compilation of the following Table IV, grouping the results of the four tests corresponding to the temperatures necessary for obtaining the optimum efficiency, i.e., the maximum transformation into dichlorethane:

TABLE IV

| Number of test | 1 | 2 | 3 | 4 |
|---|---|---|---|---|
| Structure of support used | Boehmite α-$Al_2O_3 \cdot H_2O$ | | $Al_2O_3$ γ or η | |
| Pore diameter | 33 A. | | 88 A. | |
| Impregnation, g./kg | Cu:70 | Cu:70 | Cu:70 | Cu:70 |
| Reagent flow rates, mols/hr.: | | | | |
| HCl | 3.568 | 3.487 | 1.811 | 3.458 |
| $C_2H_4$ | 1.962 | 1.918 | 0.996 | 1.890 |
| Air | 4.670 | 4.564 | 2.370 | 4.500 |
| Contact times, sec | 4.4 | 4.4 | 8.2 | 4.4 |
| Temperature of optimum yield rate in ° C | 214 | 223 | 226 | 253 |
| Optimum rate of transformation of HCl, percent | 97.9 | 97.0 | 94.9 | 86.7 |
| Purity of dichlorethane in percent by weight | 98.5 | 99.3 | 98.8 | 97.9 |

It is apparent that even when used in the fluidized state, the catalysts according to the present invention, i.e., having as a base alumina α-monohydrate, have an activity greatly superior to that of catalysts having as a base the γ or η aluminas. Moreover, they permit excellent conversion rates of hydrogen chloride to be obtained for temperatures as low as 225° C. and 215° C. In comparing the tests 2 and 4, it is also apparent that the conversion rate of hydrogen chloride is 97% when the reaction is carried out at 223° in the presence of a catalyst supported by boehmite, while this same conversion rate does not exceed 87% when the same reaction is carried out at an optimum temperature of 253° C., in the presence of a catalyst supported by a γ or η alumina.

Moreover, the dichlorethane obtained has a superior degree of purity when a catalyst support conforming to the invention is used.

Although the invention has been described in detail with reference to preferred embodiments thereof, it will be understood that variations and modifications can be effected within the spirit of the invention as described hereinabove and as defined by the appended claims.

What is claimed is:

1. In a process for the oxychlorination of unsaturated hydrocarbons having up to 6 carbon atoms, wherein said hydrocarbon is subjected to the action of hydrogen chloride and oxygen at a temperature no greater than 280° C. in the presence of a Deacon-type catalyst in a fixed bed or fluidized bed system, the improvement which comprises supporting said Deacon-type catalyst by a microporous support consisting essentially of alumina α-monohydrate.

2. The process of claim 1 wherein the oxychlorination is conducted at a temperature from about 200° C. to about 280° C.

3. The process of claim 1 further characterized in that the microporous alumina α-monohydrate has an average pore diameter of from 20 to 60 A.

4. The process of claim 3 wherein the oxychlorination is conducted at a temperature from about 200° C. to 280° C.

5. The process of claim 1 further characterized in that the Deacon-type catalyst additionally contains magnesium chloride.

References Cited

UNITED STATES PATENTS

| | | |
|---|---|---|
| 2,399,488 | 4/1946 | Hearne. |
| 3,149,171 | 9/1964 | Arganbright. |
| 3,159,455 | 12/1964 | Skaperdas et al. |
| 3,267,160 | 8/1966 | McGreevy et al. |

FOREIGN PATENTS

| | | |
|---|---|---|
| 968,933 | 9/1964 | Great Britain. |

OTHER REFERENCES

Perry: "Chem. Eng. Handbook," 4th ed., 1963, sec. 16, pp. 4–5.

BERNARD HELFIN, *Primary Examiner.*

T. G. DILLAHUNTY, *Assistant Examiner.*

U.S. Cl. X.R.

260—662